W. F. CLARK.
CONTROLLING DEVICE.
APPLICATION FILED JUNE 7, 1919.

1,373,411.

Patented Apr. 5, 1921.

Inventor.
Warren F. Clark.
By
Thurston Kwis & Hudson
attys.

UNITED STATES PATENT OFFICE.

WARREN F. CLARK, OF CLEVELAND, OHIO, ASSIGNOR TO THE STEAM ELECTRIC PRODUCTS COMPANY, OF CLEVELAND, OHIO, A CORPORATION OF OHIO.

CONTROLLING DEVICE.

1,373,411.        Specification of Letters Patent.      Patented Apr. 5, 1921.

Application filed June 7, 1919. Serial No. 302,400.

*To all whom it may concern:*

Be it known that I, WARREN F. CLARK, a citizen of the United States, residing at Cleveland, in the county of Cuyahoga and State of Ohio, have invented a certain new and useful Improvement in Controlling Devices, (B,) of which the following is a full, clear, and exact description.

This invention relates to a hot plate apparatus adapted to be directly heated by an electrical resistance coil together with means by which the functioning of the coil may be controlled to maintain the hot plate at a predetermined temperature condition.

It is an object of this invention to construct a hot plate together with the temperature controlling features in such a manner as to make them a substantially unitary device and furthermore, to so locate the temperature controlling device as to make it sensitive to changes in temperature conditions of the hot plate.

Generally speaking, the invention may be said to comprise the elements and the combinations thereof set forth in the accompanying claims.

Figure 1:
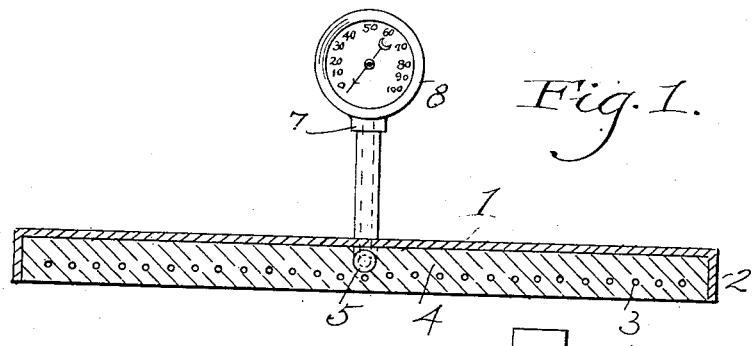
Figure 2:
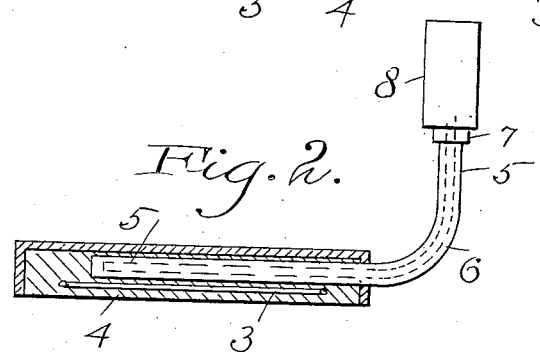
Figure 3:
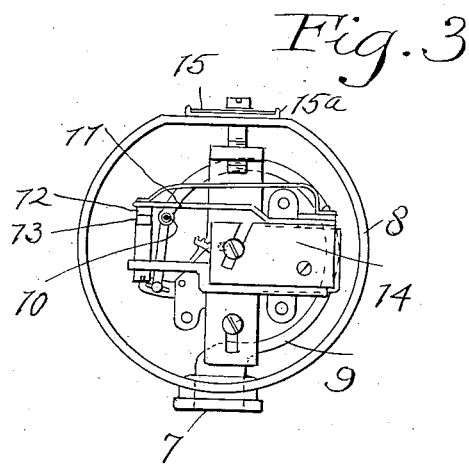

Reference should be had to the accompanying drawings forming a part of this specification in which Figure 1 is a sectional elevation of a hot plate; Fig. 2 is a sectional elevation at right angles to Fig. 1; Fig. 3 is an elevation with parts in section of a pressure responsive contact operating device.

In very many industries a hot plate is utilized for supporting material being worked upon during the manipulation thereof, and furthermore, hot plates are used as parts of restaurant equipment for the cooking of food or keeping food in heated condition as well as under other conditions.

Under substantially all circumstances in which a hot plate is used it is desirable and very frequently quite necessary that the temperature of the hot plate be maintained substantially at a uniform temperature, and furthermore, to insure that the temperature of the device does not raise sufficiently hot so that the coil becomes burned out where the apparatus is being heated by an electric coil.

A hot plate heated by an electric coil offers many advantages in that the heat is directly applied to the hot plate and furthermore, the compact construction and the low weight of the same is such as to commend its use.

In the present instance, the hot plate is one which is heated by an electrical coil and the functioning of the electrical coil is controlled by means which electrically cuts in and cuts out the electrical coil in sequence as required, in order to maintain the hot plate at the predetermined and desired temperature.

Referring to the drawings, 1 indicates the surface of a hot plate which surface is to be the functioning surface. This surface usually, although not necessarily, is formed by a flat sheet of metal, the edges of which are bent in order to form a substantially rectangular container, the said inturned flanges being represented at 2.

Adjacent the surface 1 there is placed an electric coil indicated at 3. This coil is composed of suitable resistance wire which is made to substantially cover the inside of the plate having the outer surface 1.

The resistance wire is embedded in a body of heat insulating material which is generally indicated at 4, this material being deposited within the flanges 2 and forming as it were a cover and encasement for the resistance wire.

Extending through one of the side flanges 2 is a tube 5, which tube at its end is closed. This tube extends transversely with respect to the plate 1 and the tube engages the plate or substantially engages the plate. The tube extends substantially midway between the ends of the plate. The tube is embedded in the heat insulating material, thereby insuring that it will be unaffected by anything other than the heat condition of the plate.

This tube 5 extends beyond the flange 2 and is formed with an elbow as indicated at 6, which elbow at its outer end is threaded and receives the threaded nipple 7 of a casing 8. Within the casing 8 there is housed a Bourdon tube 9, one end of which is in communication with the pipe 6 and the other end of which is closed. The closed end of the Bourdon tube carries a pin 10, which pin is located adjacent a resilient support 11. This support carries a contact member 12 and there is also a contact 13 below the contact 12. The contacts 12 and 13 are carried by a support 14 which may be adjusted as a unit thereby to vary the position of the contacts with respect to the pin 10. This adjustment is accomplished by means of the indicator 15 which is located outside of the casing, which indicator coöperates with a suitable plate 15ª, the plate having designations thereon which serve as temperature designations and of course this plate is suitably calibrated with respect to the temperatures which it indicates.

Within the tube 5 there is a suitable fluid, such as ether, where a readily volatilized fluid is desired, or if the hot plate is working under high temperature, the fluid within the tube 5 may be water, in any event the fluid is of a character such that when heated it changes to gaseous form and creates a pressure condition within the tube 5 which will be communicated to the Bourdon tube, which in response thereto expands or contracts in a manner which is familiar to those skilled in art. The movement of the Bourdon tube will in turn cause movement of the pin 10 which is in position to engage with the contact carrying support 11 and moving the same to a position such as to separate the contacts 12 and 13.

By adjusting the position of the contacts with respect to pin 10, it will be seen that the degree of movement of the Bourdon tube necessary to operate the contacts may be varied, thereby varying the temperature condition of the plate at which the contacts are separated.

The position of the tube 5 with respect to the plate 1 is such that it is in most excellent position to be effected by the temperature condition of the plate and being centrally located will function so as to maintain a substantially uniform temperature condition over all the plate.

The electrical heating coil and the contacts 12 and 13 are so electrically connected with the energizing electrical circuit that the contacts 12 and 13 are in series with the coil so that when the contacts are together current is supplied to the heating coil and when they are separated the current to the heating coil is discontinued.

The operation of the device will be obvious from what has heretofore been described.

Having described my invention, I claim—

1. An apparatus of the character described, a plate, an electric heating coil coöperating with the under surface of said plate, a temperature responsive device directly coöperating with the under surface of the plate, a pair of contacts, the engagement of which is controlled by said temperature responsive device.

2. An apparatus of the character described, a plate, an electric heating coil coöperating with the under surface of said plate, a temperature responsive device directly coöperating with the under surface of said plate, a body of non heat conducting material embedding the said coil and the said temperature responsive device, a pair of contacts and means operated by the temperature responsive device for moving one of said contacts.

3. An apparatus of the character described, a plate, an electric heating coil coöperating with the under surface of said plate, a tubular member adjacent and coöperating with said under surface of said plate, a pressure responsive device connected with said tubular member, and a pair of contacts operated by said pressure responsive device.

4. An apparatus of the character described, a plate, an electric heating coil coöperating with the under surface of said plate, a tubular member adjacent and coöperating with the said under surface of the plate, heat insulating means embedding the said electric coil and the said tubular member, a pressure responsive device connected with said tubular member, a pair of contacts and means associated with the said pressure responsive device for moving one of said contacts.

5. In an apparatus of the character described, a plate having inturned flanges at the edges thereof, a heating coil associated with a surface of the plate within the flanges, a tubular member adjacent and coöperating with the surface of the plate within the flanges, a pressure responsive device connected with said tubular member, a pair of contacts and means connected with the pressure responsive device adapted to engage one of said contacts.

In testimony whereof, I hereunto affix my signature.

WARREN F. CLARK.